(12) United States Patent
Morimoto

(10) Patent No.: US 7,852,191 B2
(45) Date of Patent: Dec. 14, 2010

(54) SENSOR AND MANUFACTURING METHOD THEREOF

(75) Inventor: Hideo Morimoto, Nara (JP)

(73) Assignee: Nitta Corporation, Osaka (JP)

( * ) Notice: Subject to any disclaimer, the term of this patent is extended or adjusted under 35 U.S.C. 154(b) by 615 days.

(21) Appl. No.: 11/939,260

(22) Filed: Nov. 13, 2007

(65) Prior Publication Data

US 2008/0117017 A1 May 22, 2008

(30) Foreign Application Priority Data

Nov. 22, 2006 (JP) ............................ 2006-315280

(51) Int. Cl.
*G01L 1/22* (2006.01)
(52) U.S. Cl. ................... 338/2; 338/47; 73/721; 73/708
(58) Field of Classification Search ............ 338/2, 338/4, 47; 73/721, 708, 727, 717, 754
See application file for complete search history.

(56) References Cited

U.S. PATENT DOCUMENTS

| | | | |
|---|---|---|---|
| 4,672,354 A * | 6/1987 | Kurtz et al. ................ | 338/4 |
| 5,499,535 A * | 3/1996 | Amano et al. .............. | 73/717 |
| 5,831,163 A | 11/1998 | Okada | |
| 6,700,473 B2 * | 3/2004 | Kurtz et al. ................ | 338/42 |
| 6,966,228 B2 * | 11/2005 | Binet et al. ................ | 73/754 |

FOREIGN PATENT DOCUMENTS

| EP | 1 621 859 | 2/2006 |
|---|---|---|
| JP | 2005-31062 | 2/2005 |

OTHER PUBLICATIONS

Patent Abstracts of Japan for Japanese Publication No. 2005-031062, Publication date Feb. 3, 2005 (2 pages).
European Search Report for European Application No. 07121086.8-1236, mailed on May 3, 2010 (4 pages).

* cited by examiner

*Primary Examiner*—Kyung Lee
(74) *Attorney, Agent, or Firm*—Osha Liang LLP

(57) ABSTRACT

A plate member 101 having flexible portions; plate members 102 to 104 having openings corresponding to the flexible portions of the plate member 101; a plate member 201 having flexible portions; and plate members 202 to 204 having openings corresponding to the flexible portions of the plate member 201 are formed by etching. The plate members 101 to 104 and 201 to 204 are bonded by diffusion bonding process to make first and second flanges 100 and 200. Interconnecting shafts are formed by cutting. The first and second flanges 100 and 200 and the interconnecting shafts are bonded by diffusion bonding process to make a strain generation unit 5. Strain gauges are attached to the lower face of the strain generation unit 5. A stain gauge type sensor 1 is thus made.

14 Claims, 15 Drawing Sheets

SENSOR AND MANUFACTURING METHOD THEREOF

BACKGROUND OF THE INVENTION

1. Field of the Invention

The present invention relates to a sensor that can detect a multiaxial force, and also to a manufacturing method of the sensor.

2. Description of Related Art

Japanese Patent Unexamined Publication No. 2005-31062 discloses a six-axis sensor including first and second disk-shaped members. Either of the first and second members has four diaphragms. The corresponding diaphragms of the first and second members are opposed to each other. A shaft stands at the center of each diaphragm. The shafts of each pair of opposed diaphragms of the first and second members are joined to each other with a bolt. The first and second members are thereby united. A number of strain gauges are disposed on the outer face of the first member. Forces and moments are detected on the basis of a change in the resistance value of each strain gauge.

A strain generation unit in which first and second disk-shaped members are interconnected through their shafts as described above is difficult to be formed by cutting a single body. In general, therefore, two or three parts are separately formed by cutting, and then the parts are interconnected by welding or with screws. However, in the first and second members, an annular groove must be formed around the shaft of each diaphragm. The size of each groove reduces as the sensor is miniaturized. This makes the cutting work of each groove difficult. It is particularly difficult to process each groove to be deep. It is very difficult to control variation in the thickness of the thin portion at each groove. Therefore, a special skilled worker or workers and much time are required for making such a strain generation unit. There is a problem that the miniaturization of the sensor leads to a marked increase in manufacturing cost.

The above problem may arise in not only a strain gauge type sensor as described above, but also a capacitance or resistance type sensor having a strain generation unit similar in shape.

SUMMARY OF THE INVENTION

An object of the present invention is to provide a sensor and a manufacturing method of the sensor, wherein the sensor can be miniaturized at reduced manufacturing cost.

According to a first aspect of the present invention, a sensor comprises a strain generation unit and a detecting element disposed on one end face of the strain generation unit. The strain generation unit comprises a first member having a first flexible portion, a second member having a second flexible portion being opposed to the first flexible portion, and an interconnecting member interconnecting the first and second members. Either of the first and second members comprises a plurality of plate members processed by etching and bonded by diffusion bonding process. The first and second members and the interconnecting members are bonded to each other by diffusion bonding process.

According to a second aspect of the present invention, there is provided a manufacturing method of a sensor comprising a strain generation unit and a detecting element disposed on one end face of the strain generation unit. The strain generation unit comprises a first member having a first flexible portion, a second member having a second flexible portion being opposed to the first flexible portion, and an interconnecting member interconnecting the first and second members. The method comprises a processing step of processing by etching a plurality of plate members that are to constitute the first and second members; a first making step of bonding by diffusion bonding process the plurality of plate members processed in the processing step to make the first and second members; a second making step of making the interconnecting member; a third making step of bonding by diffusion bonding process the first and second members made in the first making step and the interconnecting member made in the second making step to make the strain generation unit; and an attaching step of attaching the detecting element to the strain generation unit.

According to the invention, a plurality of plate members processed by etching are bonded to each other by diffusion bonding process to make the first or second members. By using the etching technique, a large number of very thin plate members can be accurately processed at low cost. In addition, processing strain can be reduced. Further, as the initial cost, it is only necessary to make etching masks in accordance with plate members to be processed. This reduces the manufacturing cost. As a result, the sensor can be miniaturized at reduced manufacturing cost. Further, because a plurality of plate members can be tightly bonded, they can efficiently transmit force and strain as if as a single member.

In the present sensor, the plurality of plate members of the first member may comprise a first plate member having the first flexible portion, and at least one second plate member having an opening at a position corresponding to the first flexible portion. The plurality of plate members of the second member may comprise a third plate member having the second flexible portion, and at least one fourth plate member having an opening at a position corresponding to the second flexible portion. Each of the first and second flexible portions may comprise an annular groove and a thick portion disposed inside the annular groove. The interconnecting member may be disposed within the openings of the second and fourth plate members to interconnect the thick portions of the first and third plate members.

In the present manufacturing method of a sensor, the plurality of plate members of the first member may comprise a first plate member having the first flexible portion, and at least one second plate member having an opening at a position corresponding to the first flexible portion. The plurality of plate members of the second member may comprise a third plate member having the second flexible portion, and at least one fourth plate member having an opening at a position corresponding to the second flexible portion. Each of the first and second flexible portions may comprise an annular groove and a thick portion disposed inside the annular groove. The interconnecting member may be disposed within the openings of the second and fourth plate members to interconnect the thick portions of the first and third plate members.

In the present sensor, the plurality of plate members of the first member may comprise a first plate member having the first flexible portion, and at least one second plate member having a thin portion at a position corresponding to the first flexible portion. The plurality of plate members of the second member may comprise a third plate member having the second flexible portion, and at least one fourth plate member having a thin portion at a position corresponding to the second flexible portion. Each of the first and second flexible portions and the thin portions comprises an annular groove and a thick portion disposed inside the annular groove. The interconnecting member may interconnect the thick portion of the second plate member nearest to the second member and the thick portion of the fourth member nearest to the first member.

In the present manufacturing method of a sensor, the plurality of plate members of the first member may comprise a first plate member having the first flexible portion, and at least one second plate member having a thin portion at a position corresponding to the first flexible portion. The plurality of plate members of the second member may comprise a third plate member having the second flexible portion, and at least one fourth plate member having a thin portion at a position corresponding to the second flexible portion. Each of the first and second flexible portions and the thin portions comprises an annular groove and a thick portion disposed inside the annular groove. The interconnecting member may interconnect the thick portion of the second plate member nearest to the second member and the thick portion of the fourth member nearest to the first member.

In the present sensor, the interconnecting member may comprise a plurality of plate members processed by etching.

In the present manufacturing method of a sensor, the interconnecting member may comprise a plurality of plate members processed by etching.

In the present sensor, the sensor may be a strain gauge type sensor comprising a strain gauge or a piezoresistive element as the detecting element.

In the present manufacturing method of a sensor, the sensor may be a strain gauge type sensor comprising a strain gauge or a piezoresistive element as the detecting element.

In the present sensor, the sensor may be a capacitance type sensor comprising the detecting element having a pair of electrodes being opposed to each other at a distance.

In the present manufacturing method of a sensor, the sensor may be a capacitance type sensor comprising the detecting element having a pair of electrodes being opposed to each other at a distance.

In the present sensor, the sensor may be a resistance type sensor comprising the detecting element having a pressure-sensitive resistive substance between a pair of electrodes.

In the present manufacturing method of a sensor, the sensor may be a resistance type sensor comprising the detecting element having a pressure-sensitive resistive substance between a pair of electrodes.

BRIEF DESCRIPTION OF THE DRAWINGS

Other and further objects, features and advantages of the invention will appear more fully from the following description taken in connection with the accompanying drawings in which.

DESCRIPTION OF THE PREFERRED EMBODIMENTS

Figure 1:
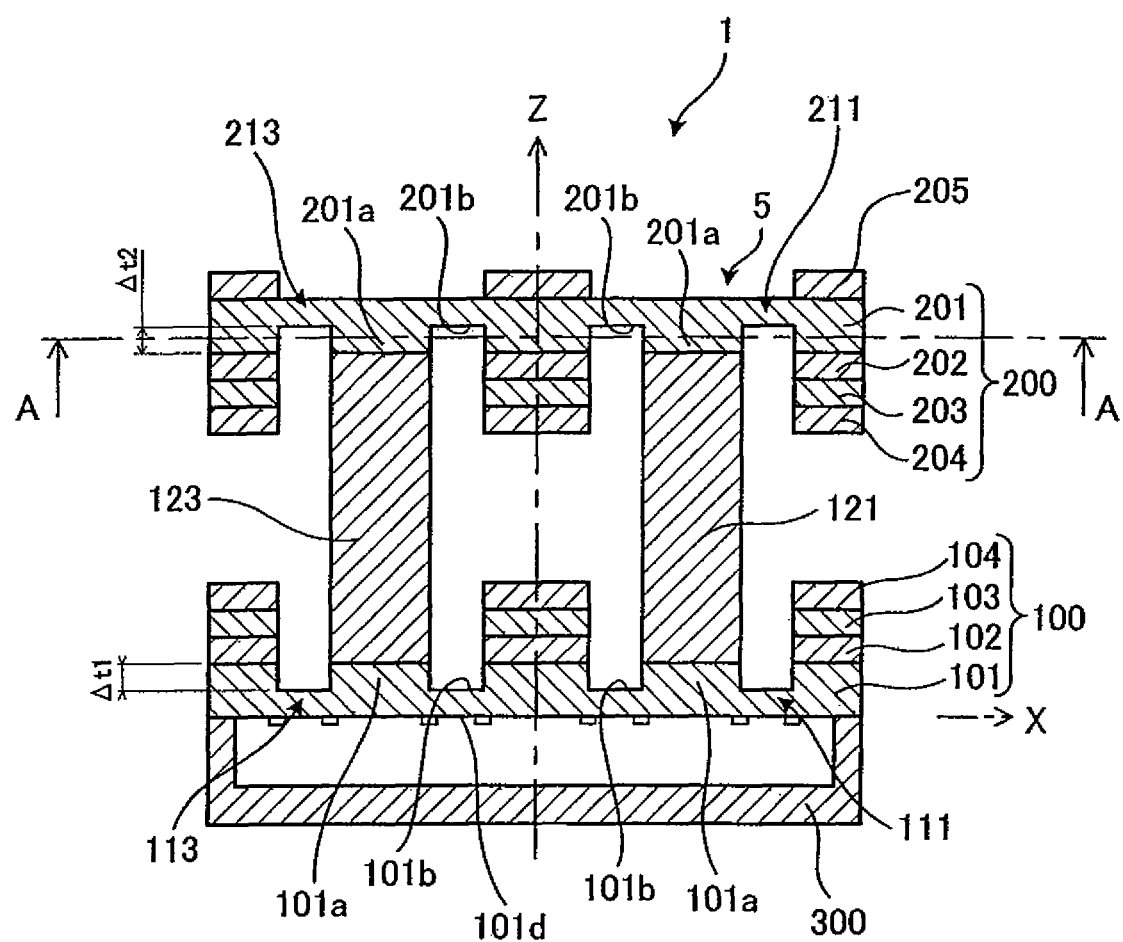
FIG. 1 is a central vertical sectional front view of a strain gauge type sensor according to a first embodiment of the present invention.
Figure 2:
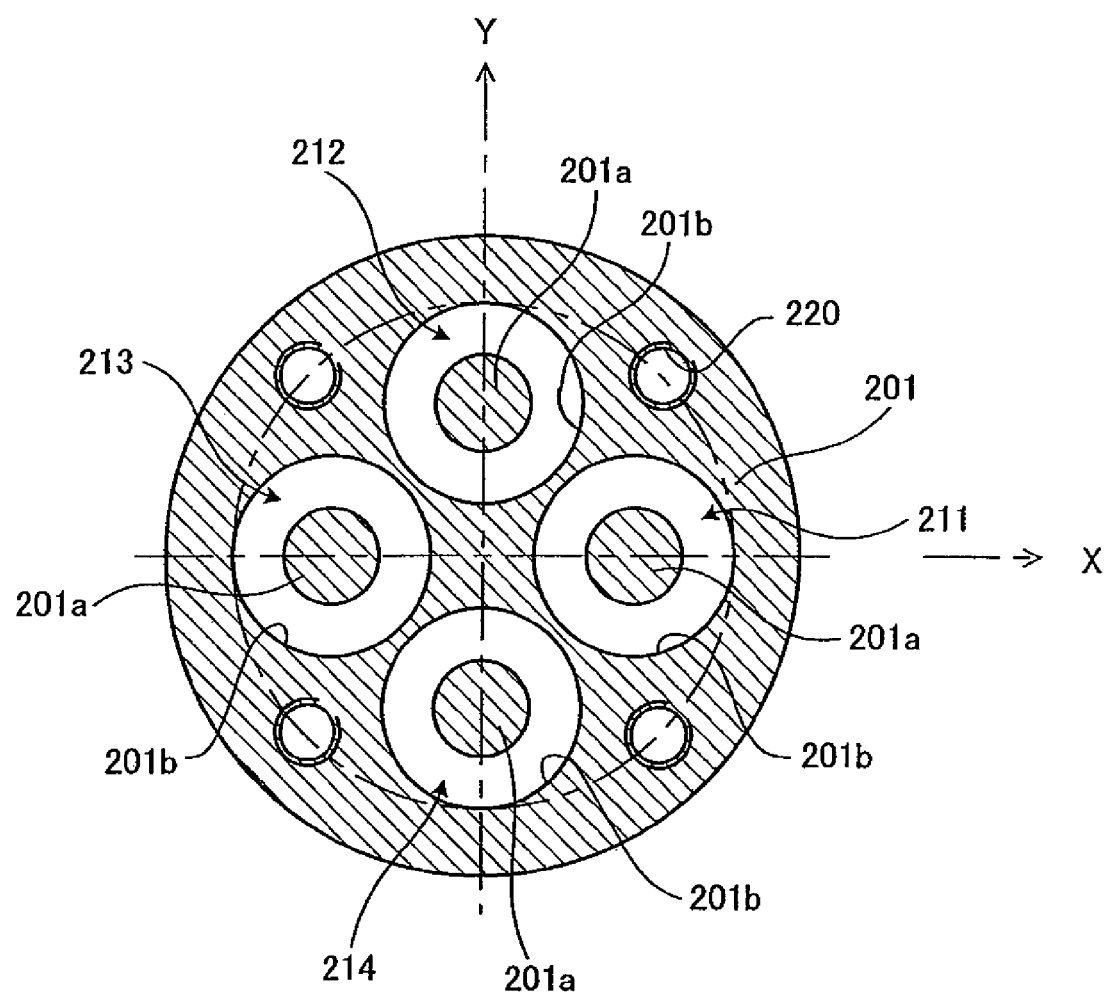
FIG. 2 is a sectional view taken along line A-A in FIG. 1.
Figure 3:
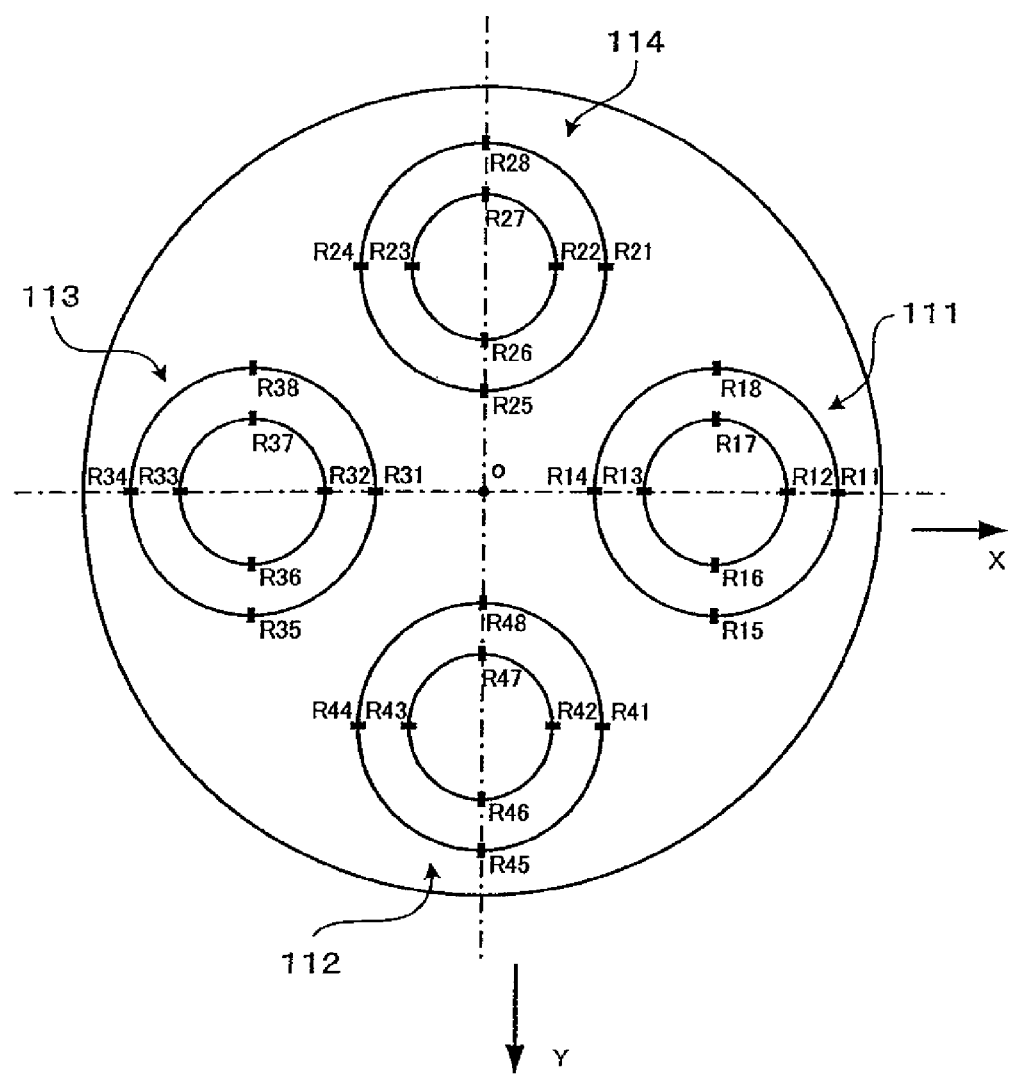
FIG. 3 shows the arrangement of strain gauges.

Hereinafter, preferred embodiments of the present invention will be described with reference to the drawings. FIG. 1 is a central vertical sectional front view of a strain gauge type sensor according to a first embodiment of the present invention. FIG. 2 is a sectional view taken along line A-A in FIG. 1. FIG. 3 shows the arrangement of strain gauges.

The strain gauge type sensor 1 of FIG. 1 includes a strain generation unit 5 and a number of strain gauges attached to the lower face of the strain generation unit 5. The strain generation unit 5 includes a first flange 100 fixed to a sufficiently rigid base 300; a second flange 200 disposed so as to be opposed to the first flange 100; and interconnecting shafts 121 to 124 interconnecting the first and second flanges 100 and 200.

The base 300 has a circular profile. The base 300 is recessed at a middle area of its upper face. The first flange 100 is supported by the peripheral portion of the base 300 around the recess. Thus, the base 300 covers the strain gauges attached to the lower face of the first flange 100. The base 300 has not-shown screw holes for fixing the sensor 1 at an appropriate place.

Either of the first and second flanges 100 and 200 is made of metal such as stainless steel, and formed into a disk shape. In this embodiment, either of the first and second flanges 100 and 200 has its outer diameter of about 15 mm. The first flange 100 is constituted by plate members 101 to 104 put in layers. The second flange 200 is constituted by plate members 201 to 204 put in layers. A plate member 205 is disposed on the upper face of the second flange 200. In this embodiment, either of the plate members 101 and 201 has its thickness of about 1.5 mm; and each of the plate members 102 to 104 and 202 to 205 has its thickness of about 1 mm. The plate member 101 of the first flange 100 has four thin flexible portions 111 to 114. The plate member 201 of the second flange 200 has four thin flexible portions 211 to 214. A middle area of each of the flexible portions 111 to 114 is formed into a thick portion 101a. A middle area of each of the flexible portions 211 to 214 is formed into a thick portion 201a. The thick portions 101a of the plate member 101 of the first flange 100 is connected to the thick portions 201a of the plate member 201 of the second plate 200 by the interconnecting shafts 121 to 124, respectively. In this embodiment, each of the interconnecting shafts 121 to 124 has its length of about 10 mm.

In this embodiment, the first flange 100 serves as the fixed side, and the second flange 200 serves as the force receiving side. As shown in FIG. 2, screw holes 220 are formed in the second flange 200 for attaching a component in accordance with a purpose. In this embodiment, the plate member 205 is disposed on the upper face of the second flange 200, that is, the opposite face of the second flange 200 from the interconnecting shafts 121 to 124. As a result, recesses each of which has its depth corresponding to the thickness of the plate member 205 are formed at positions corresponding to the respective flexible portions 211 to 214. Thus, when a force is applied to the component attached to the upper face of the second flange 200, the component is prevented from coming into contact with the flexible portions 211 to 214. This brings about smooth generation of displacement or strain at the flexible portions 211 to 214.

Each of the flexible portions 111 to 114 of the first flange 100 has a thick portion 101a and an annular groove 101b formed around the thick portion 101a. The thick portion 101a and the annular groove 101b make a difference delta t1 in level. As shown in FIG. 3, the flexible portions 111 to 114 are disposed at positive and negative positions on X- and Y-axes. Thirty-two strain gauges R11 to R18, R21 to R28, R31 to R38, and R41 to R48 are disposed in a single plane on the lower face of the first flange 100 within the recess of the base 300.

In this embodiment, eight strain gauges are attached to each of the flexible portions 111 to 114 at positions corresponding to outer and inner edges of the thin portion of the flexible portion on a straight line extending parallel to the X-axis through the center of the flexible portion and a straight line extending parallel to the Y-axis through the center of the flexible portion. That is, the strain gauges are attached at the positions where the largest strain is generated in each of the flexible portions 111 to 114.

Each of the flexible portions 211 to 214 of the second flange 200 has a thick portion 201a and an annular groove 201b formed around the thick portion 201a. The thick portion 201a and the annular groove 201b make a difference delta t2 in level. The first and second flanges 100 and 200 are interconnected by the interconnecting shafts 121 to 124 so that the flexible portions 111 to 114 are opposed to the flexible portions 211 to 214, respectively. Therefore, the first and second flanges 100 and 200 and the interconnecting shafts 121 to 124 are substantially vertically axisymmetrical.

As described above, the first flange 100 has the flexible portions 111 to 114, and the second flange 200 has the flexible portions 211 to 214. Therefore, when a force is applied to the second flange 200, the flexible portions 111 to 114 of the first flange 100 receive through the interconnecting shafts 121 to 124 forces in accordance with the applied force. As a result, strains are generated in the flexible portions 111 to 114 in accordance with the intensity and direction of the applied force in the three-dimensional space. Thus, the strain gauge type sensor 1 functions as a six-axis force sensor for measuring forces on three orthogonal axes in the three-dimensional space, and moments around the respective axes. Because the present invention relates to the construction of a sensor, the principle for detecting forces and moments is omitted here. The principle for detecting forces and moments is the same as that described in the above Japanese Patent Unexamined Publication No. 2005-31062 by the same applicant as the applicant of the present application.

Figure 4A:
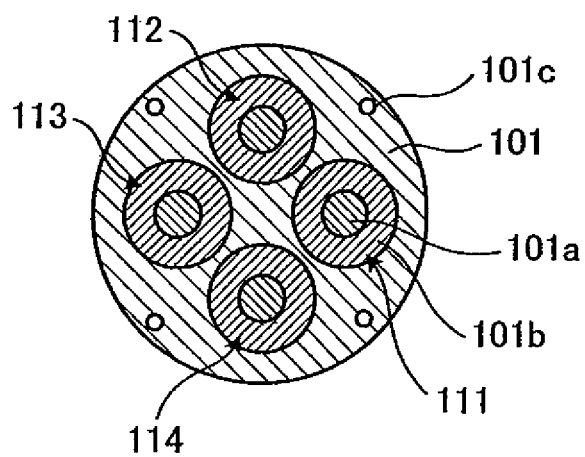
FIGS. 4A to 4D show plate members that constitute a first flange.
Figure 4B:
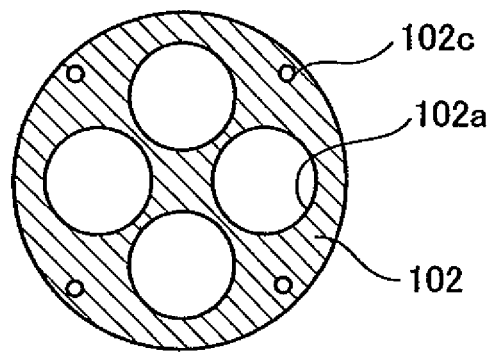
Figure 4C:
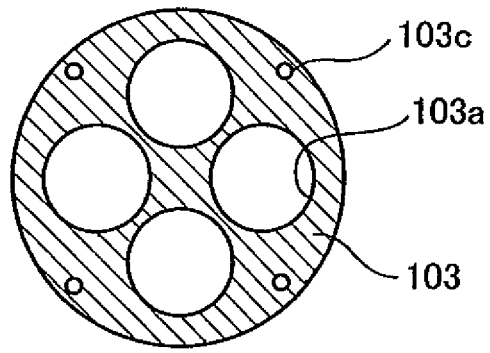
Figure 4D:
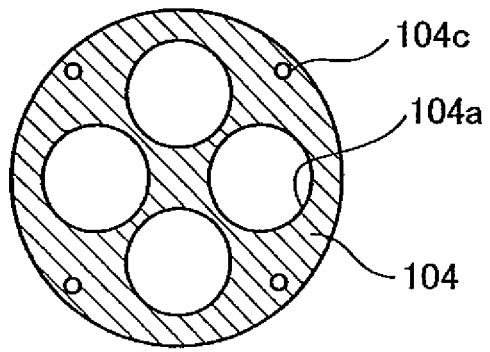
Figure 5C:
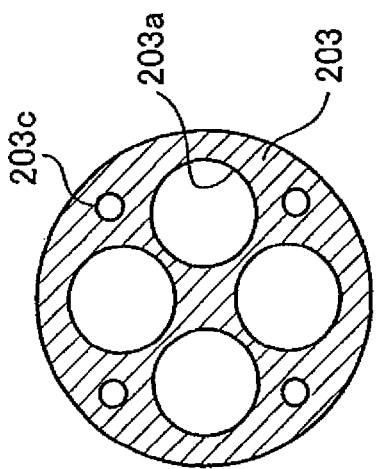
FIGS. 5A to 5E show plate members that constitute a second flange, and a plate member to be disposed on the upper face of the second flange.
Figure 5B:
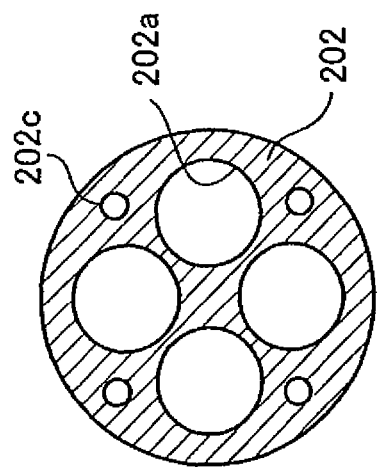
Figure 5E:
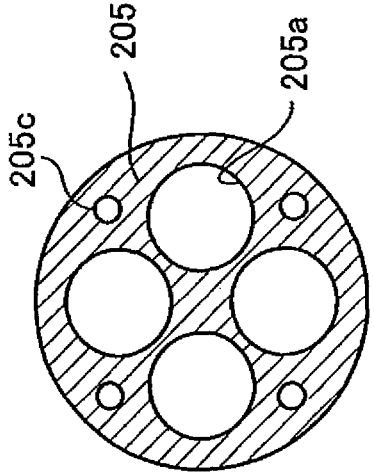
Figure 5D:
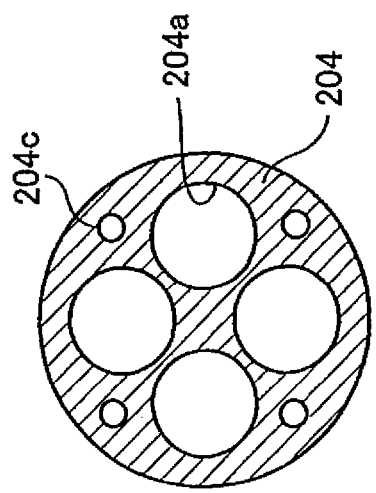
Figure 5A:
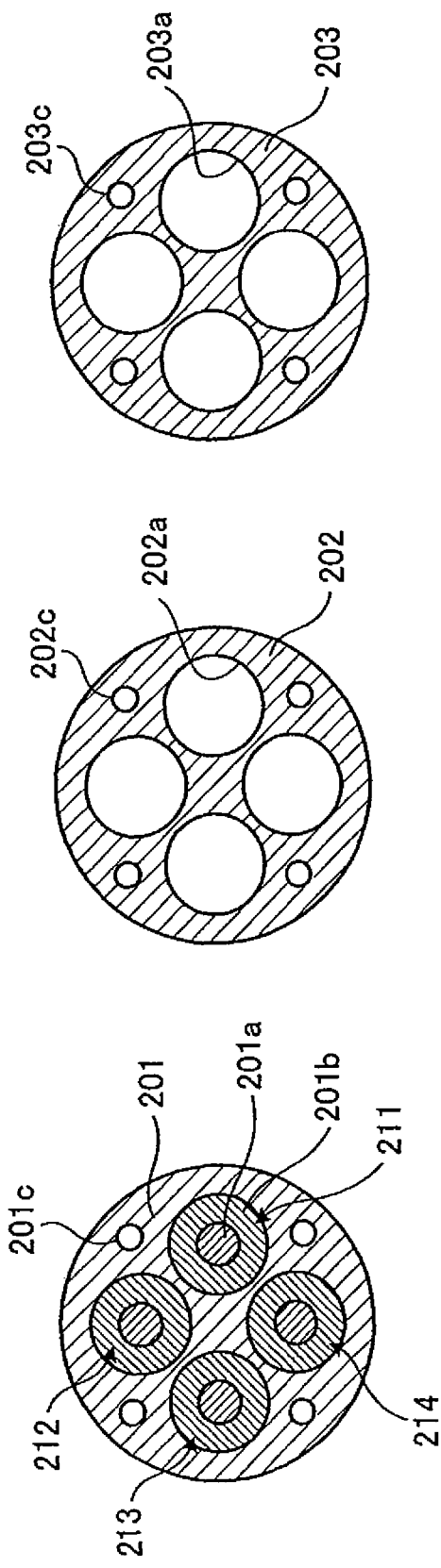
Figure 6:
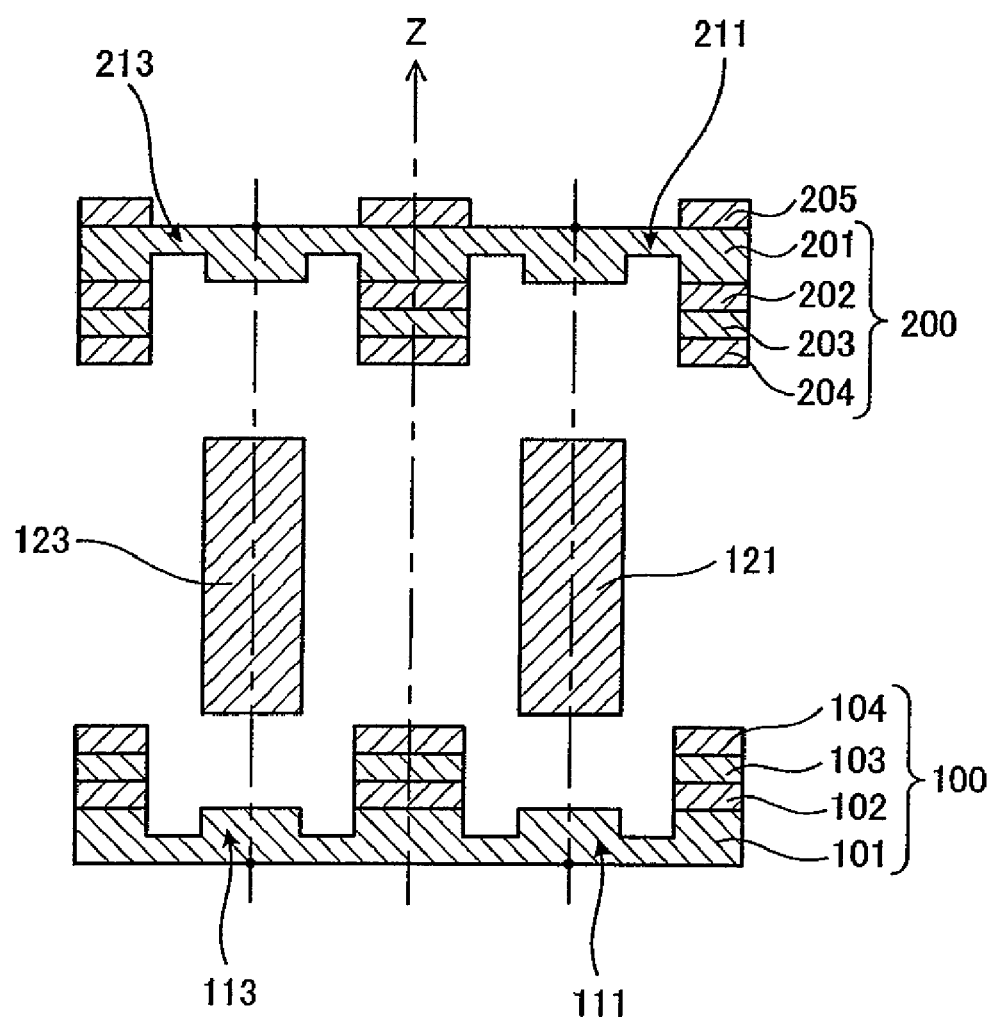
FIG. 6 shows a process of interconnecting the first and second flanges.

Next, a manufacturing method of the strain gauge type sensor 1 will be described with reference to FIGS. 4 to 6. FIGS. 4A to 4D show the plate members that constitute the first flange. FIGS. 5A to 5E show the plate members that constitute the second flange, and the plate member to be disposed on the upper face of the second flange. FIG. 6 shows a process of interconnecting the first and second flanges.

First, the profile and holes 101c of the plate member 101 are formed by etching a stainless steel plate. Next, the annular grooves 101b are formed by half-etching. The thick portion 101a is thereby formed inside each annular groove 101b. Thus, as shown in FIG. 4A, the plate member 101 having four flexible portions 111 to 114 is formed. In a modification, the profile and holes 101c of the plate member 101 may be formed by etching after the annular grooves 101b are formed by half-etching.

Next, the profile, openings 102a, and holes 102c of the plate member 102 are formed by etching another stainless steel plate. Each opening 102a has substantially the same size as each of the flexible portions 111 to 114. Thus, as shown in FIG. 4B, the plate member 102 having four openings 102a is formed. Next, as shown in FIGS. 4C and 4D, because the plate members 103 and 104 have the same shape as the plate member 102, they are formed using the same etching mask as the plate member 102. The plate members 102 to 104 have the same thickness. In a modification, the plate members 101 to 104 may be formed at once using an etching mask having different patterns.

After the plate members 101 to 104 are formed, they are put in layers so that the center of each thick portion 101a of the plate member 101, that is, the center of each annular groove 101b, coincides with the center of the corresponding ones of the openings 102a to 104a of the plate members 102 to 104, and the centers of the corresponding holes 101c to 104c coincide with each other. In this state, they are bonded to each other by diffusion bonding process. The first flange 100 is thus made. The holes 101c to 104c of the plate members 101 to 104 are processed by tapping to serve as screw holes for fixing the first flange 100 to the base 300.

Next, similarly to the process of making the first flange 100, the plate members 201 to 204 are formed as shown in FIGS. 5A to 5D, and then they are bonded to each other by diffusion bonding process to make the second flange 200. Also, the plate member 205 is formed as shown in FIG. 5E. As will be described later, the plate member 205 is bonded to the upper face of the second flange 200 by laser welding or the like after the first and second flanges 100 and 200 and the interconnecting shafts 121 to 124 are united by bonding. In a modification, when a component for another purpose is attached, the plate member 205 may be interposed without being fixed to the second flange 200.

Separately from the processes of making the first and second flanges 100 and 200, the columnar interconnecting shafts 121 to 124 are formed by cutting. The diameter of each of the interconnecting shafts 121 to 124 is substantially equal to the diameter of each thick portion 101a of the plate member 101 of the first flange 100 and the diameter of each thick portion 201a of the plate member 201 of the second flange 200.

After the first and second flanges 100 and 200 and the interconnecting shafts 121 to 124 are made as described above, as shown in FIG. 6, they are positioned so that the centers of the flexible portions 111 to 114, the centers of the flexible portions 211 to 214, and the central axes of the interconnecting shafts 121 to 124 are respectively aligned with each other. In this state, the first and second flanges 100 and 200 and the interconnecting shafts 121 to 124 are bonded to each other by diffusion bonding process. The strain generation unit 5 is thus made. In bonding, after the interconnecting shafts 121 to 124 is bonded to one of the first and second flanges 100 and 200 by diffusion bonding process, the other the first and second flanges 100 and 200 is bonded to the interconnecting shafts 121 to 124 by diffusion bonding process. Alternatively, the first and second flanges 100 and 200 and the interconnecting shafts 121 to 124 may be bonded at once by diffusion bonding process. Afterward, thirty-two strain gauges are attached to the lower face of the strain generation unit 5, that is, the lower face of the first flange 100. In addition, the plate member 205 is bonded to the upper face of the second flange 200 by laser welding or the like. The strain gauge type sensor 1 is thus made.

As described above, in the strain gauge type sensor 1 of this embodiment, plate members processed by etching are bonded to each other by diffusion bonding process to make the first or second flange 100 or 200 of the strain generation unit 5. By using the etching technique, a large number of very thin plate members can be accurately processed at low cost. In addition, processing strain can be reduced. Further, the initial cost only includes the initial expense of molds for diffusion bonding process and the expense of etching masks for the metal plate members. This reduces the manufacturing cost. As a result, the sensor can be miniaturized at reduced manufacturing cost. Further, because the plate members can be tightly bonded, they can efficiently transmit force and strain as if as a single member.

In the first flange 100 of the strain generation unit 5, each annular groove 101b of the plate member 101 and the peripheral portions of the corresponding ones of the openings 102a to 104a of the plate members 102 to 104, that is, the portions corresponding to the circumference of each of the interconnecting shafts 121 to 124, are continuous. This means that a deep annular groove having its depth corresponding to the sum of the depth of the annular groove 101b and the thicknesses of the plate members 102 to 104 is formed around each of the interconnecting shafts 121 to 124 of the strain generation unit 5. The depth of the deep annular groove can be arbitrarily changed by changing the number of plate members put in layers on the plate member 101 or the thickness of each plate member put in layers on the plate member 101. This applies to the second flange 200. Therefore, in the present invention, even in the case of a deep groove difficult to be formed by cutting, the deep groove can be formed by put a number of plate members in layers. Because such a deep groove can be formed, the length of each interconnecting shaft can be increased to improve the sensitivity of the sensor. In addition, the rigidity of the portion outside each deep groove of the strain generation unit can be increased.

The strain gauge type sensor 1 can function as a six-axis force sensor even when the first and second flanges 100 and 200 do not have the thick portions 101a and 201a and the annular grooves 101b and 201b of the plate members 101 and 201. However, from the point of the characteristic of force detection, the thick portions and the annular grooves are preferably formed in the first and second flanges 100 and 200. This point will be described with reference to FIG. 7.

Figure 7:
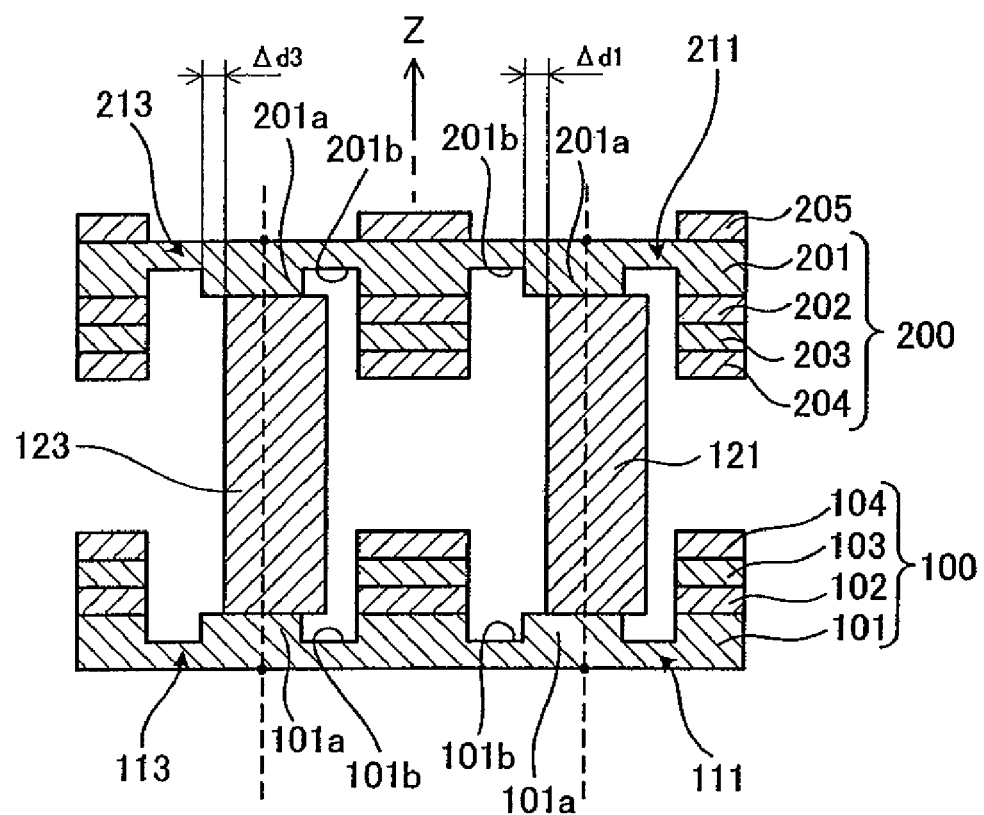
FIG. 7 is for explaining an advantage of the strain gauge type sensor of FIG. 1.

As shown in FIG. 7, it is assumed that the first and second flanges 100 and 200 and the interconnecting shafts 121 to 124 are bonded to each other by diffusion bonding process in a state wherein the straight lines extending through the centers of the flexible portions 111 to 114 and the centers of the flexible portions 211 to 214 are shifted from the central axes of the interconnecting shafts 121 to 124 by delta d1, delta d2, delta d3, and delta d4, respectively, though FIG. 7 shows only delta d1 and delta d3. In comparison with the portions of the annular grooves 101b and 201b, the rigidity of the thick portions 101a and 201a is sufficiently large and they are hard to be bent. In addition, because the annular grooves 101b and 201b and the thick portions 101a and 201a are formed by etching, their centers are accurately positioned. Therefore, a force received by the second flange 200 can be transmitted to the first flange 100 with being scarcely affected by the positional shifts of the interconnecting shafts 121 to 124. Thus, formation of the thick portions and the annular grooves in the first and second flanges 100 and 200 prevents a reduction in the accuracy of force detection and an increase in the interference between axes caused by that the force received by the second flange 200 can not accurately be transmitted to the first flange 100 due to the positional shifts of the interconnecting shafts 121 to 124.

Figure 8:
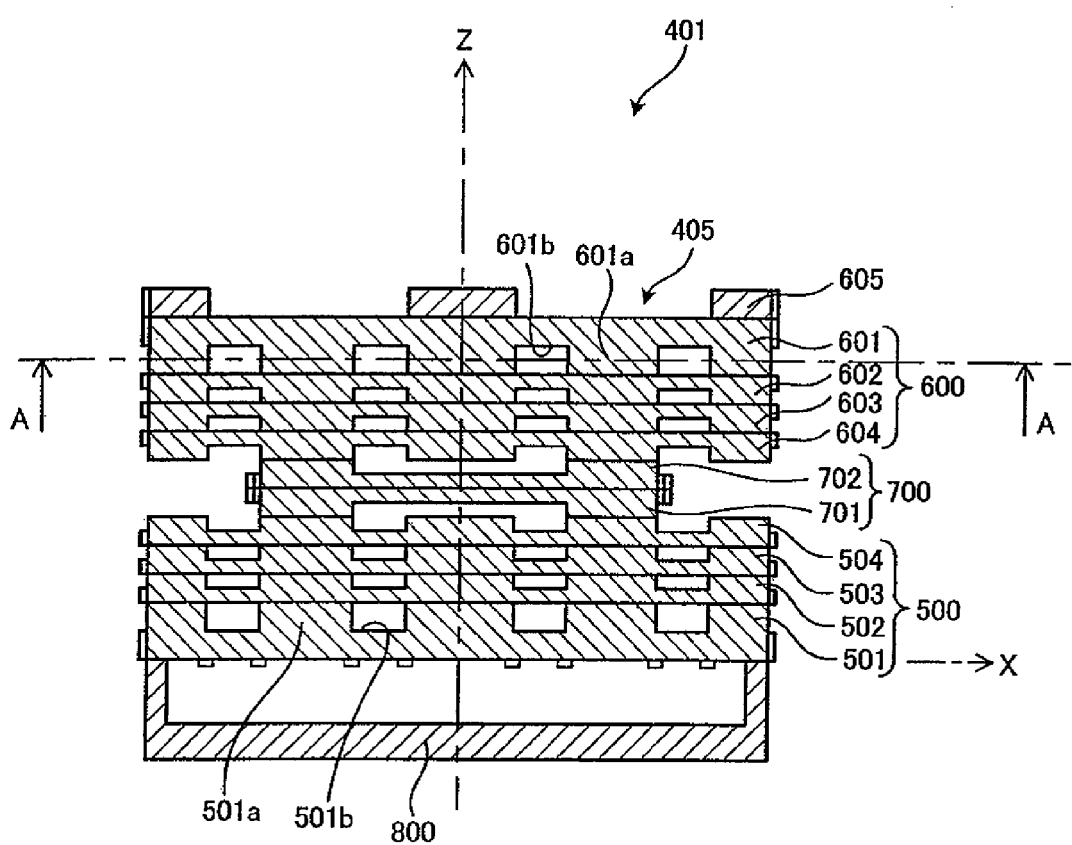
FIG. 8 is a central vertical sectional front view of a strain gauge type sensor according to a second embodiment of the present invention.
Figure 9:
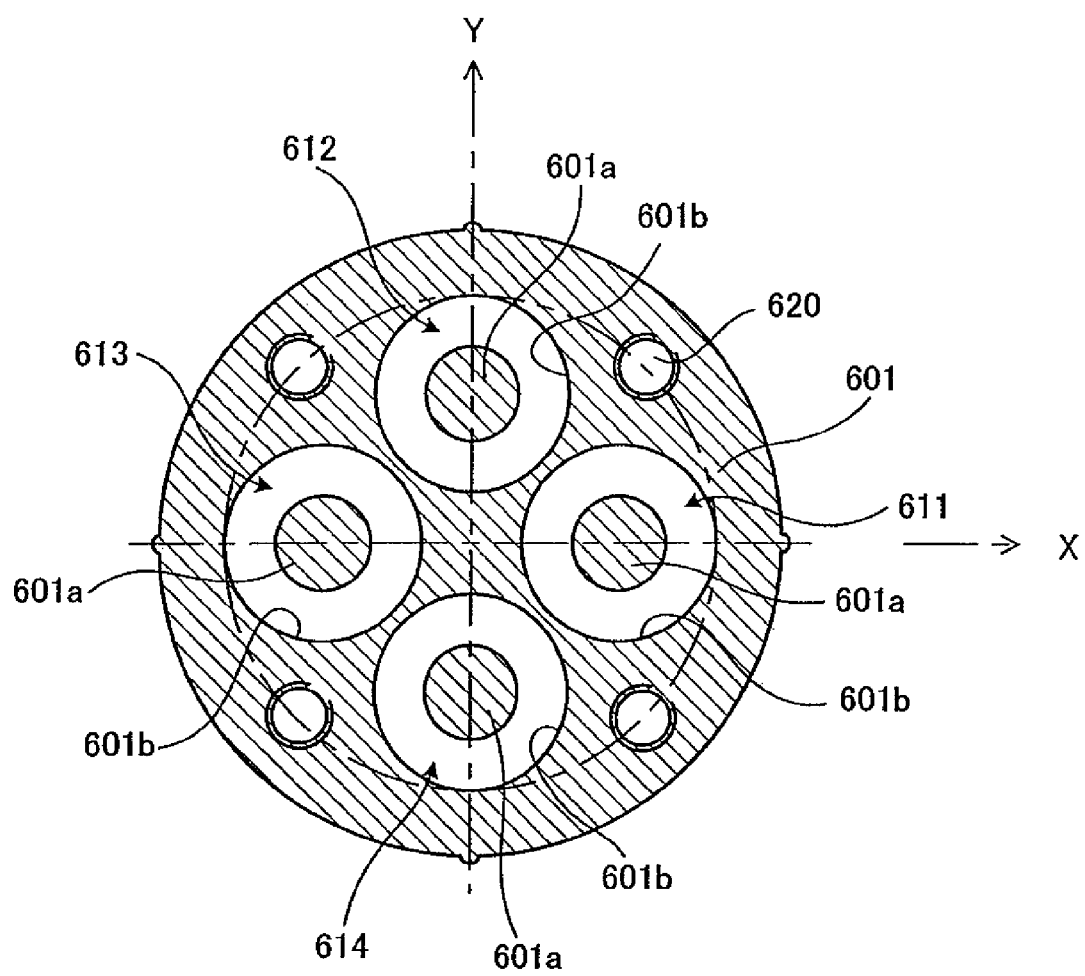
FIG. 9 is a sectional view taken along line A-A in FIG. 8.

Next, a strain gauge type sensor according to a second embodiment of the present invention will be described with reference to FIGS. 8 and 9. FIG. 8 is a central vertical sectional front view of the strain gauge type sensor according to the second embodiment of the present invention. FIG. 9 is a sectional view taken along line A-A in FIG. 8.

The strain gauge type sensor 401 of FIG. 8 includes a strain generation unit 405 and a number of strain gauges attached to the lower face of the strain generation unit 405. The strain generation unit 405 includes a first flange 500 fixed to a sufficiently rigid base 800; a second flange 600 disposed so as to be opposed to the first flange 500; and an interconnecting plate 700 interconnecting the first and second flanges 500 and 600.

The base 800 has a circular profile. The base 800 is recessed at a middle area of its upper face. The first flange 500 is supported by the peripheral portion of the base 800 around the recess. Thus, the base 800 covers the strain gauges attached to the lower face of the first flange 500. The base 800 has not-shown screw holes for fixing the sensor 401 at an appropriate place.

Either of the first and second flanges 500 and 600 is made of metal such as stainless steel, and formed into a disk shape. The first flange 500 is constituted by plate members 501 to 504 put in layers. The second flange 600 is constituted by plate members 601 to 604 put in layers. A plate member 605 is disposed on the upper face of the second flange 600. The plate member 501 of the first flange 500 has four thin flexible portions 511 to 514. The plate member 601 of the second flange 600 has four thin flexible portions 611 to 614. A middle area of each of the flexible portions 511 to 514 is formed into a thick portion 501a. A middle area of each of the flexible portions 611 to 614 is formed into a thick portion 601a.

The plate members 502 to 504 of the first flange 500 and the plate members 602 to 604 of the second flange 600 respectively have four thin portions 502b to 504b and 602b to 604b. Middle areas of the thin portions are formed into thick portions 502a to 504a and 602a to 604a, respectively. The thick portion 504a of the plate member 504 of the first flange 500 is connected to the thick portion 604a of the plate member 604 of the second flange 600 by the interconnecting plate 700.

In this embodiment, the first flange 500 serves as the fixed side, and the second flange 600 serves as the force receiving side. As shown in FIG. 9, screw holes 620 are formed in the second flange 600 for attaching a component in accordance with a purpose. In this embodiment, the plate member 605 is disposed on the upper face of the second flange 600, that is, the opposite face of the second flange 600 from the interconnecting plate 700. As a result, recesses each of which has its depth corresponding to the thickness of the plate member 605 are formed at positions corresponding to the respective thin portions. Thus, when a force is applied to the component attached to the upper face of the second flange 600, the component is prevented from coming into contact with the thin portions of the plate member 601. This brings about smooth generation of displacement or strain at the thin portions of the plate member 601.

As shown in FIG. 9, the flexible portions 511 to 514 of the first flange 500 and the flexible portions 611 to 614 of the second flange 600 are disposed at positive and negative positions on X- and Y-axes. Thirty-two strain gauges R11 to R18, R21 to R28, R31 to R38, and R41 to R48 are disposed in a single plane on the lower face of the first flange 500 within the recess of the base 800. The arrangement of the strain gauges is the same as that of the first embodiment as shown in FIG. 3, and therefore the detailed description is omitted here.

As described above, the first flange 500 has the flexible portions 511 to 514, and the second flange 600 has the flexible portions 611 to 614. Therefore, when a force is applied to the second flange 600, the thin portions of the plate member 501 of the first flange 500 receive through the interconnecting plate 700 forces in accordance with the applied force. As a result, strains are generated in the thin portions in accordance with the intensity and direction of the applied force in the three-dimensional space. Thus, the strain gauge type sensor 401 functions as a six-axis force sensor for measuring forces on three orthogonal axes in the three-dimensional space, and moments around the respective axes. Because the present invention relates to the construction of a sensor, the principle for detecting forces and moments is omitted here. The principle for detecting forces and moments is the same as that described in the above Japanese Patent Unexamined Publication No. 2005-31062 by the same applicant as the applicant of the present application.

Figure 10:
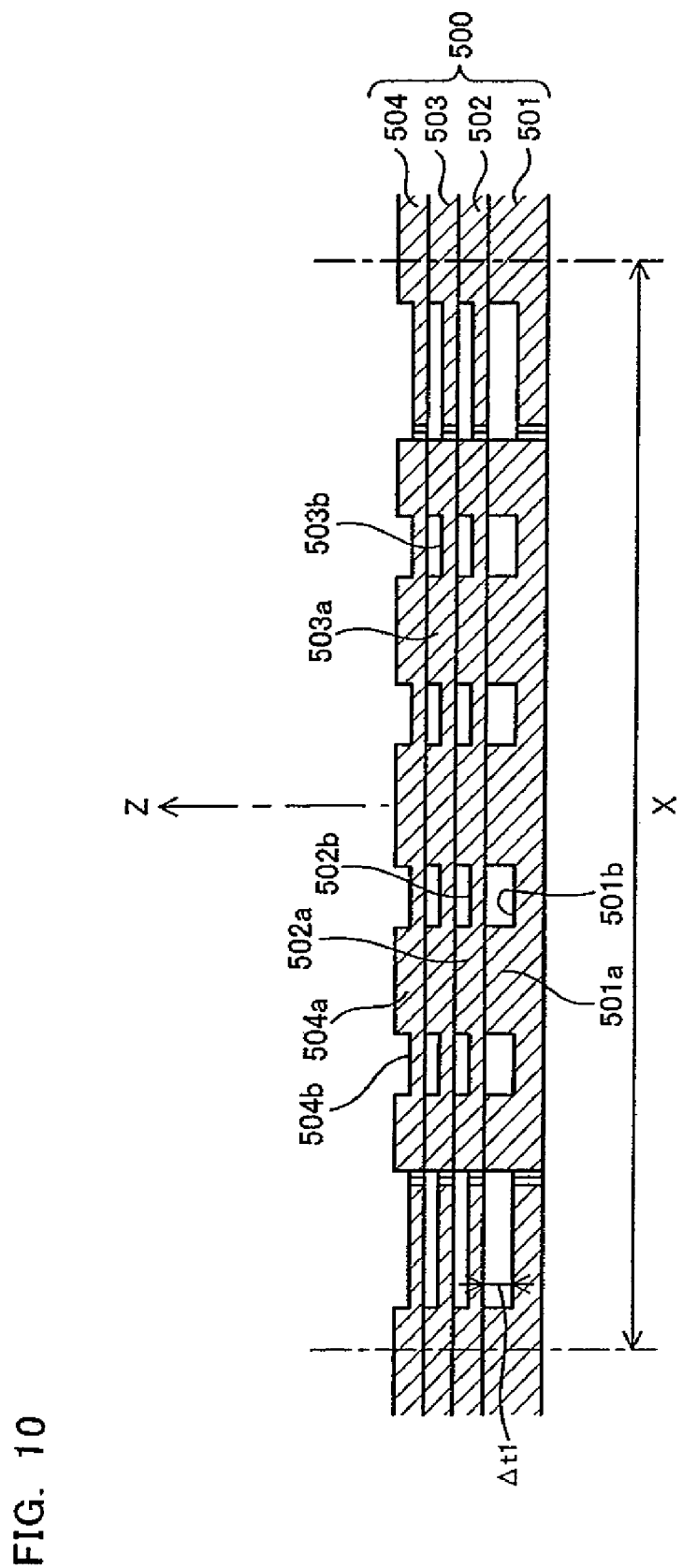
FIG. 10 shows the structure of a first flange according to the second embodiment.
Figure 11:
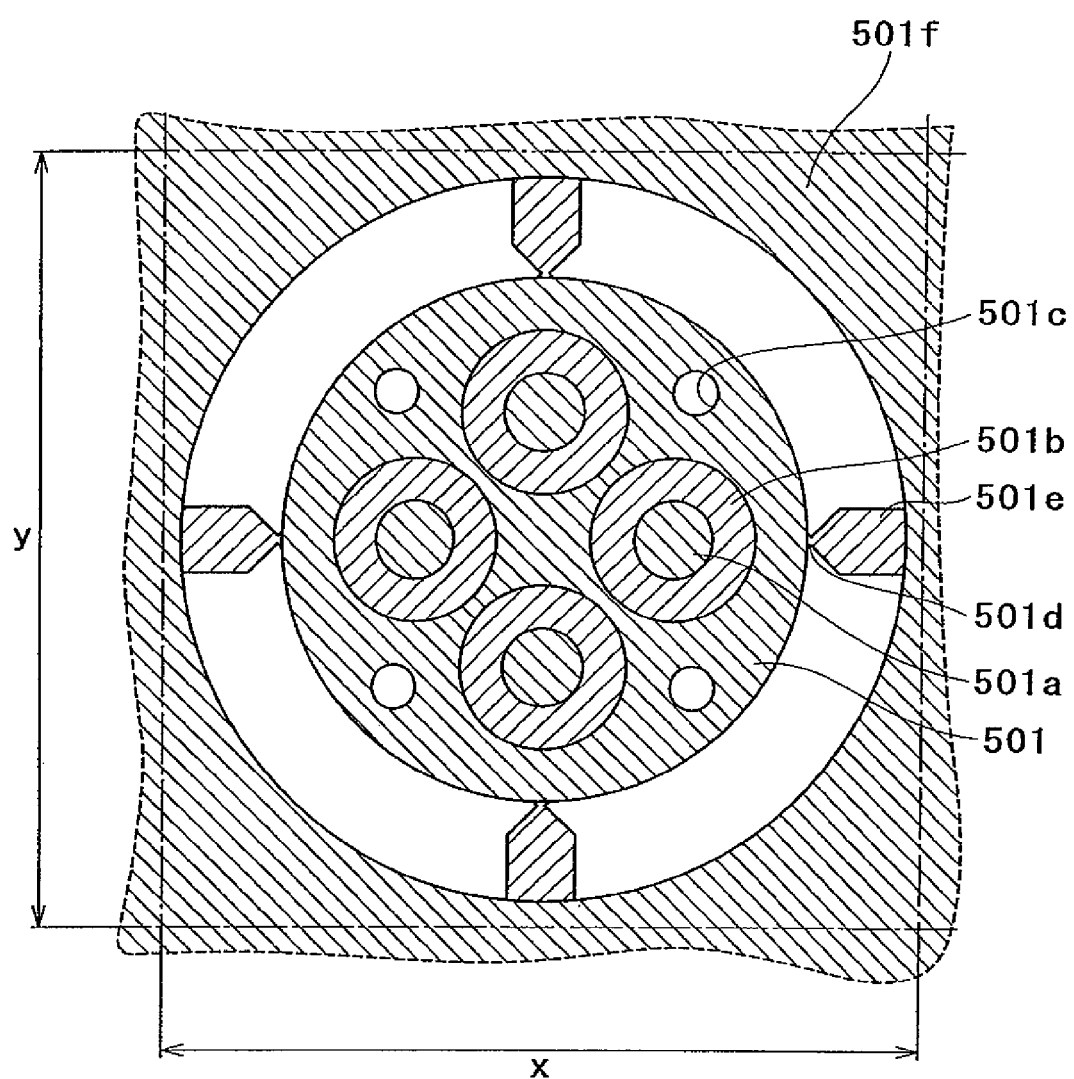
FIG. 11 shows the shape of a plate member that constitutes the first flange.
Figure 12:
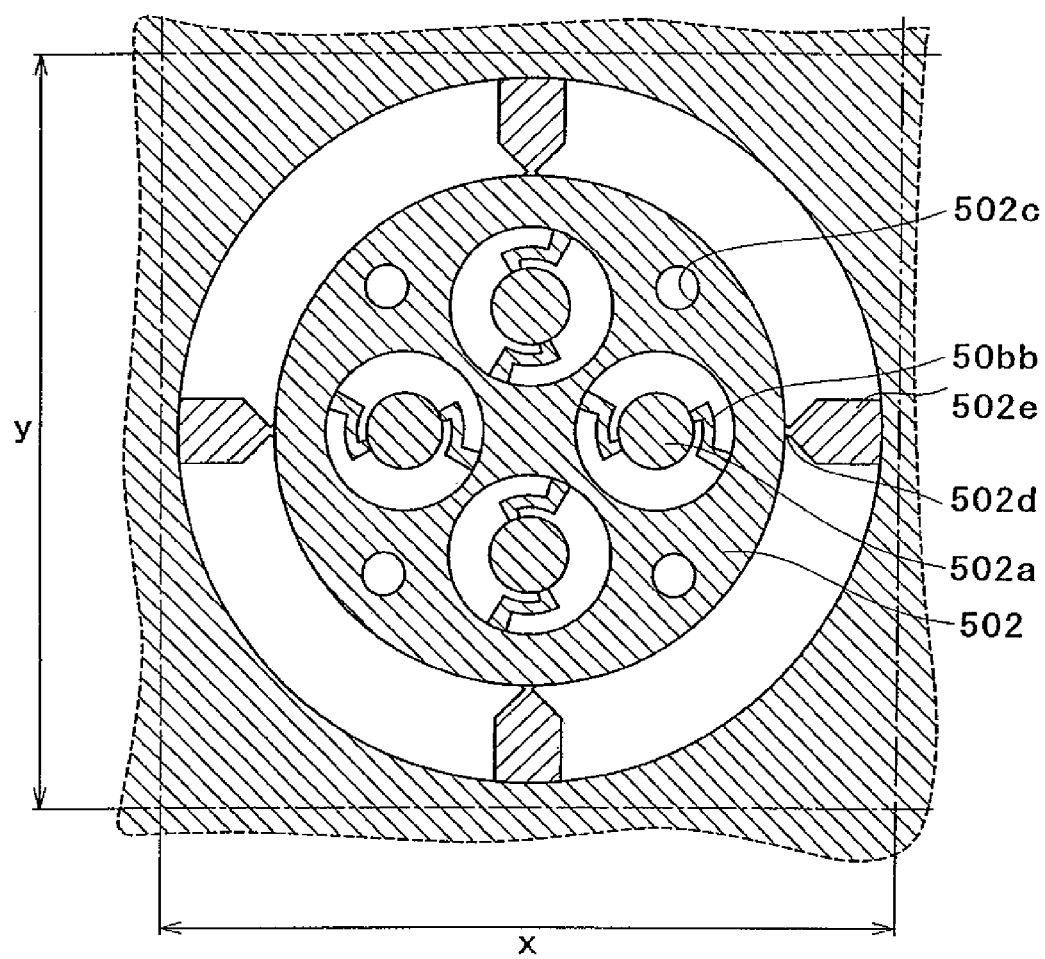
FIG. 12 shows the shape of another plate member that constitutes the first flange.
Figure 13:
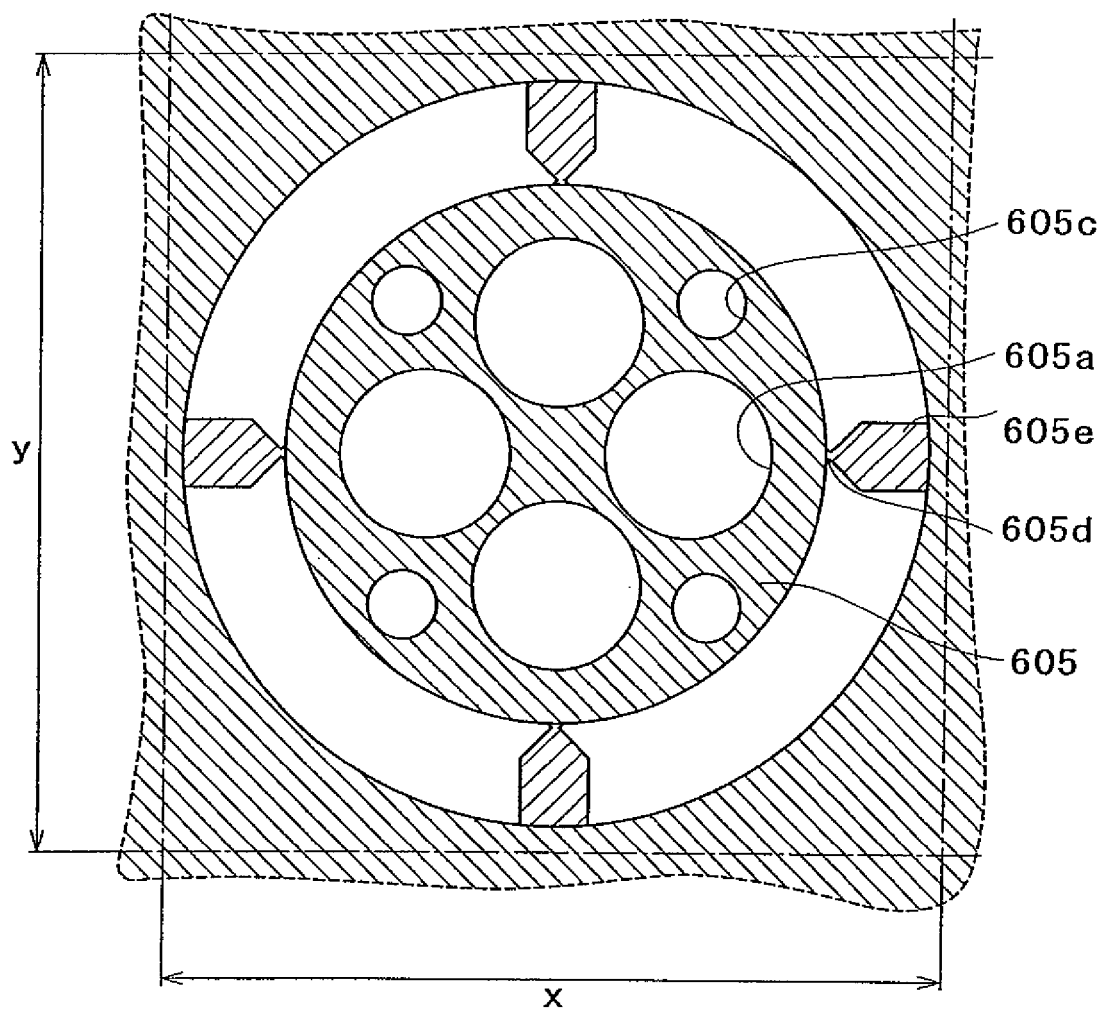
FIG. 13 shows the shape of a plate member that constitutes a second flange according to the second embodiment.
Figure 14:
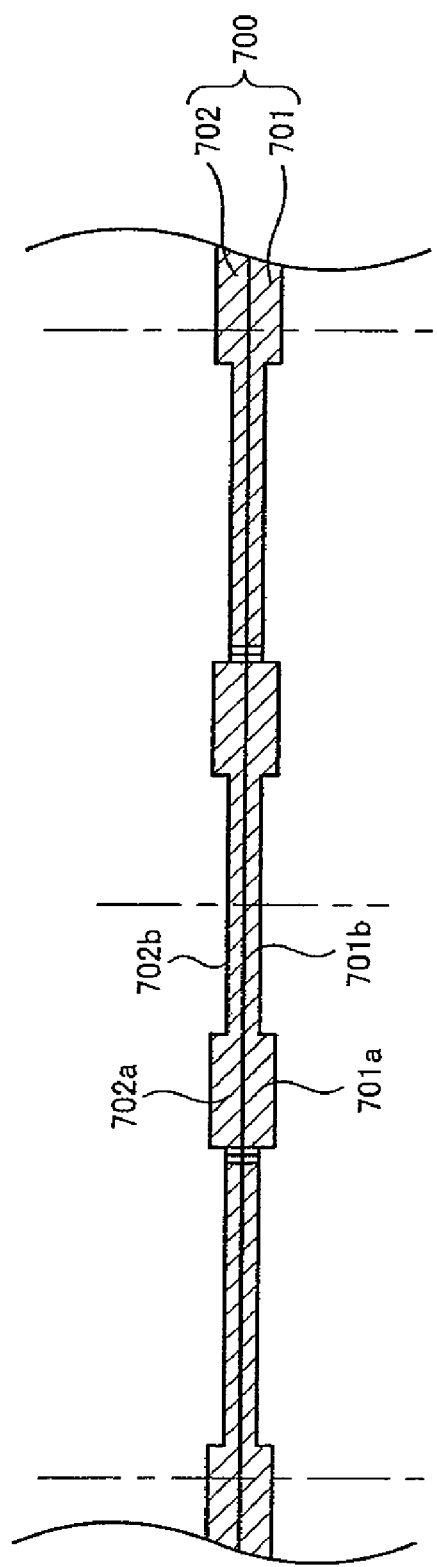
FIG. 14 shows the structure of an interconnecting plate according to the second embodiment.
Figure 15:
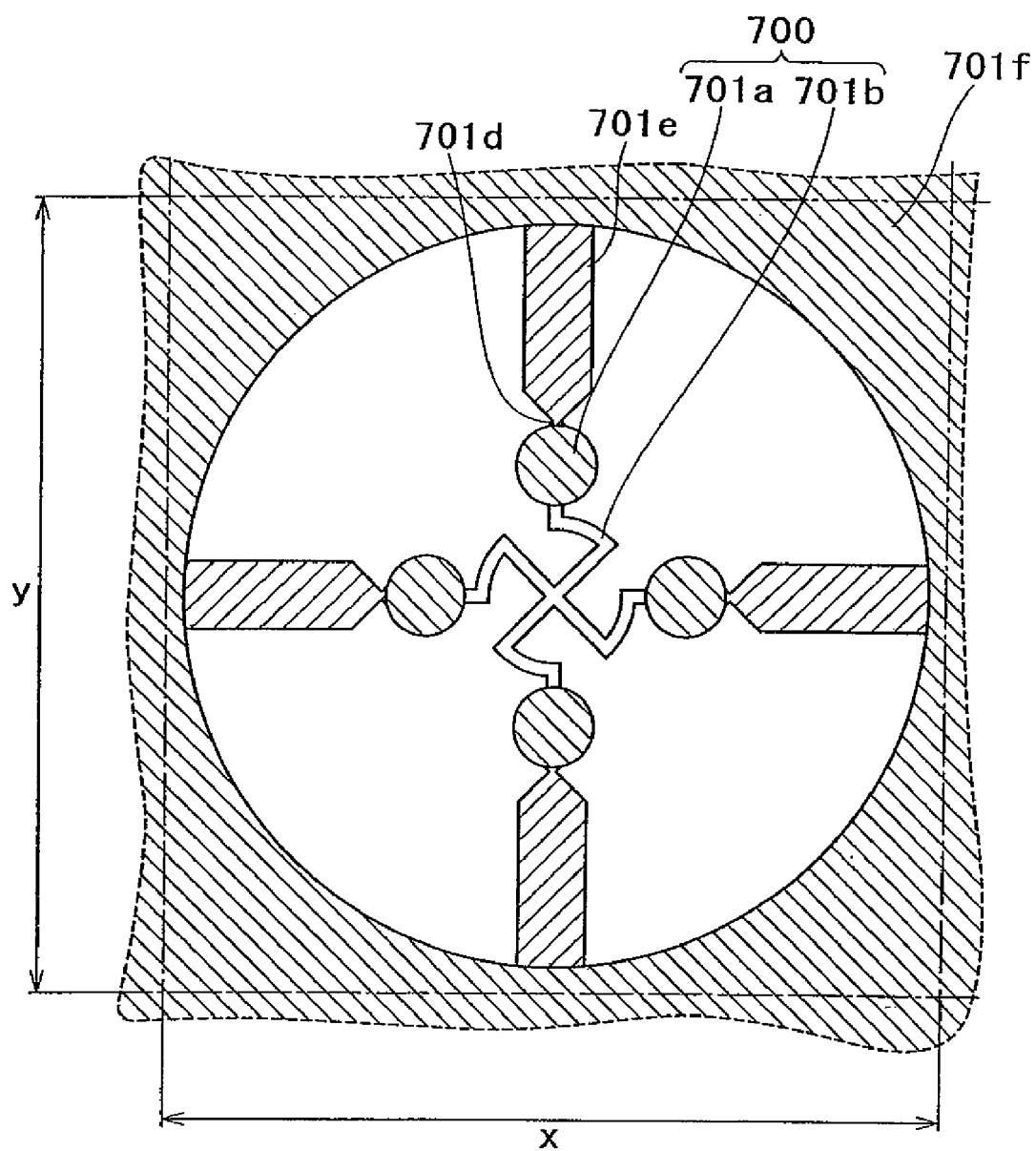
FIG. 15 shows the shape of a plate member that constitutes the interconnecting plate.

Next, a manufacturing method of the strain gauge type sensor 401 will be described with reference to FIGS. 10 to 15. FIG. 10 shows the structure of the first flange. FIG. 11 shows the shape of a plate member that constitutes the first flange. FIG. 12 shows the shape of another plate member that constitutes the first flange. FIG. 13 shows the shape of a plate member that constitutes the second flange. FIG. 14 shows the structure of the interconnecting plate. FIG. 15 shows the shape of a plate member that constitutes the interconnecting plate.

First, the profile and holes 501c of the plate member 101 are formed by etching a stainless steel plate. Next, the annular grooves 501b are formed by half-etching. The thick portion 501a is thereby formed inside each annular groove 501b. Thus, as shown in FIG. 11, the plate member 501 having four flexible portions 511 to 514 is formed. In this embodiment, as shown in FIGS. 10 and 11, the plate member 501 is formed to be weakly connected to a frame 501f through cutouts 501d and connecting portions 501e. The region having its lateral length x and vertical length y as shown in FIGS. 10 and 11 serves as a basic unit that is repeatedly formed in accordance with the whole size of the metal plate.

Next, the profile, thick portions 502a, bridges 502b, and holes 502c of the plate member 502 are formed by etching another stainless steel plate. Each thick portion 502a has substantially the same size as each thick portion 501a of the plate member 501. Each thick portion 502a is formed within an opening formed through the plate member 502. Two thin bridges 502b connect each thick portion 502a to the peripheral portion of the corresponding opening. Each bridge 502b is formed into a zigzag shape. Therefore, each thick portion 502a can be displaced freely to a certain extent. The plate member 502 having four thick portions 502a is thus formed. The region having its lateral length x and vertical length y as shown in FIG. 12 serves as a basic unit that is repeatedly formed in accordance with the whole size of the metal plate.

Because the plate members 503 and 504 have the same shape as the plate member 502, they are formed using the same etching mask as the plate member 502. The plate members 502 to 504 have the same thickness.

After the plate members 501 to 504 are formed, they are put in layers so that the centers of the thick portions 501a to 504a coincide with each other. In this state, they are bonded to each other by diffusion bonding process. The first flange 500 is thus made. The holes 501c to 504c of the plate members 501 to 504 are processed by tapping to serve as screw holes for fixing the first flange 500 to the base 800.

Next, similarly to the process of making the first flange 500, the plate members 601 to 604 are formed, and then they are bonded to each other by diffusion bonding process to make the second flange 600. Also, the plate member 605 is formed. In forming the plate member 605, the shape of the plate member 605 including openings 605a and holes 605c is formed by etching another stainless steel plate. The plate member 605 having four openings 605a is thus formed. As will be described later, the plate member 605 is bonded to the upper face of the second flange 600 by laser welding or the like after the first and second flanges 500 and 600 and the interconnecting plate 700 are united by bonding. In a modification, when a component for another purpose is attached, the plate member 605 may be interposed without being fixed to the second flange 600.

Next, the profile, thick portions 701a, and bridges 701b of a plate member 701 are formed by etching another stainless steel plate. As shown in FIGS. 14 and 15, the plate member 701 is formed to be weakly connected to a frame 701f through cutouts 701d and connecting portions 701e. The region having its lateral length x and vertical length y as shown in FIGS. 14 and 15 serves as a basic unit that is repeatedly formed in accordance with the whole size of the metal plate 701. Four thin bridges 701b connect four thick portions 701a to each other. Each bridge 701b is formed into a zigzag shape. Therefore, each thick portion 701a can be displaced freely to a certain extent.

Next, a plate member 702 having the same shape as the plate member 701 is formed using the same etching mask as the plate member 701. The plate members 701 and 702 have the same thickness. After the plate members 701 and 702 are formed, they are put in layers so that the center of each thick portion 701a of the plate member 701 coincides with the center of the corresponding thick portion 702a of the plate member 702. In this state, they are bonded to each other by diffusion bonding process to make the interconnecting plate 700.

After the first and second flanges 500 and 600 and the interconnecting plate 700 are made as described above, they are positioned so that the centers of the thick portions of the respective components are aligned with each other. In this state, they are bonded to each other by diffusion bonding process. Strain generation units 405 are thus made. Each strain generation unit 405 is weakly connected to a frame through the connecting portions extending from each frame, and the cutouts. Therefore, each strain generation unit 405 can easily be separated from the frame. Afterward, thirty-two strain gauges are attached to the lower face of the strain generation unit 405, that is, the lower face of the first flange 500. In addition, the plate member 605 is bonded to the upper face of the second flange 600 by laser welding or the like. The strain gauge type sensor 401 is thus made.

As described above, in the strain gauge type sensor 401 of this embodiment, plate members processed by etching are bonded to each other by diffusion bonding process to make the first or second flange 500 or 600 or the interconnecting plate 700 of the strain generation unit 5. By using the etching technique, a large number of very thin plate members can be accurately processed at low cost. In addition, processing strain can be reduced. Further, the initial cost only includes the initial expense of molds for diffusion bonding process and the expense of etching masks for the metal plate members. This reduces the manufacturing cost. As a result, the sensor can be miniaturized at reduced manufacturing cost.

In this embodiment, not only the plate members 501 to 504 constituting the first flange 500 and the plate members 601 to 605 constituting the second flange 600, but also the plate members 701 and 702 constituting the interconnecting plate 700 are processed by etching. Therefore, a large number of interconnecting plates 700 can be accurately processed at low cost. In the plate members 502 to 504 of the first flange 500 and the plate members 602 to 604 of the second flange 600, each thick portion is connected by bridges. Therefore, deformation, that is, elongation or contraction, of each bridge prevents interference to displacement of each flexible portion or the interconnecting plate. The bridges surely connect parts of each component so that the positional relation between the parts does not vary in handling the component when manufacturing. This makes it easy to handle the component as a single metal plate. The whole size of the force sensor of the present invention can be determined in accordance with the intensity of force to be detected, that is, rating. Otherwise, control can be made by the depth of each annular groove, the thickness of each thick portion inside the annular groove, or the thickness of each plate member. In the latter case, because the sensor can be accommodated to the rating by selection of the thickness of each plate member or control of the etching depth, it is not required to prepare a new mold or a new etching mask. This is an advantage that additional initial cost is not required.

In the above-described first and second embodiments, the structures of the strain generation units of the sensors have been described by way of example. The number of plate members or the thickness of each plate member constituting the first or second flange may be changed according to need. In addition, the number of interconnecting shafts or plates may be changed. Further, the present invention is not limited to the case that all plate members have the same profile. The profiles of some plate members may be changed for purposes.

In the above-described first and second embodiments, the strain gauge type sensors having strain gauges as detecting elements have been described. The strain gauges may be piezoresistive elements. However, the present invention is not limited to such a strain gauge type sensor. According to the present invention, the same effects can be obtained even in the case of a capacitance type sensor using detecting elements each having a pair of electrodes being opposed to each other at a distance, or a resistance type sensor using detecting elements having a pressure-sensitive resistive substance between a pair of electrodes.

While this invention has been described in conjunction with the specific embodiments outlined above, it is evident that many alternatives, modifications and variations will be apparent to those skilled in the art. Accordingly, the preferred embodiments of the invention as set forth above are intended to be illustrative, not limiting. Various changes may be made without departing from the spirit and scope of the invention as defined in the following claims.

What is claimed is:

1. A sensor comprising a strain generation unit and a detecting element disposed on one end face of the strain generation unit, characterized in that
    the strain generation unit comprises a first member having a first flexible portion, a second member having a second flexible portion being opposed to the first flexible portion, and an interconnecting member interconnecting the first and second members;
    either of the first and second members comprises a plurality of plate members processed by etching and bonded by diffusion bonding process; and
    the first and second members and the interconnecting members are bonded to each other by diffusion bonding process.

2. The sensor according to claim 1, characterized in that the plurality of plate members of the first member comprises a first plate member having the first flexible portion, and at least one second plate member having an opening at a position corresponding to the first flexible portion;
    the plurality of plate members of the second member comprises a third plate member having the second flexible portion, and at least one fourth plate member having an opening at a position corresponding to the second flexible portion;
    each of the first and second flexible portions comprises an annular groove and a thick portion disposed inside the annular groove; and
    the interconnecting member is disposed within the openings of the second and fourth plate members to interconnect the thick portions of the first and third plate members.

3. The sensor according to claim 1, characterized in that the plurality of plate members of the first member comprises a first plate member having the first flexible portion, and at least one second plate member having a thin portion at a position corresponding to the first flexible portion;
    the plurality of plate members of the second member comprises a third plate member having the second flexible portion, and at least one fourth plate member having a thin portion at a position corresponding to the second flexible portion;
    each of the first and second flexible portions and the thin portions comprises an annular groove and a thick portion disposed inside the annular groove; and
    the interconnecting member interconnects the thick portion of the second plate member nearest to the second member and the thick portion of the fourth member nearest to the first member.

4. The sensor according to claim 3, characterized in that the interconnecting member comprises a plurality of plate members processed by etching.

5. The sensor according to any of claim 1, characterized in that the sensor is a strain gauge type sensor comprising a strain gauge or a piezoresistive element as the detecting element.

6. The sensor according to any of claim 1, characterized in that the sensor is a capacitance type sensor comprising the detecting element having a pair of electrodes being opposed to each other at a distance.

7. The sensor according to any of claim 1, characterized in that the sensor is a resistance type sensor comprising the detecting element having a pressure-sensitive resistive substance between a pair of electrodes.

8. A manufacturing method of a sensor comprising a strain generation unit comprising a first member having a first flexible portion, a second member having a second flexible portion being opposed to the first flexible portion, and an interconnecting member interconnecting the first and second members, and a detecting element disposed on one end face of the strain generation unit, characterized by comprising:
    a processing step of processing by etching a plurality of plate members that are to constitute the first and second members;
    a first making step of bonding by diffusion bonding process the plurality of plate members processed in the processing step to make the first and second members;
    a second making step of making the interconnecting member;
    a third making step of bonding by diffusion bonding process the first and second members made in the first making step and the interconnecting member made in the second making step to make the strain generation unit; and an attaching step of attaching the detecting element to the strain generation unit.

9. The method according to claim 8, characterized in that the plurality of plate members of the first member comprises a first plate member having the first flexible portion, and at least one second plate member having an opening at a position corresponding to the first flexible portion;

the plurality of plate members of the second member comprises a third plate member having the second flexible portion, and at least one fourth plate member having an opening at a position corresponding to the second flexible portion;

each of the first and second flexible portions comprises an annular groove and a thick portion disposed inside the annular groove; and the interconnecting member is disposed within the openings of the second and fourth plate members to interconnect the thick portions of the first and third plate members.

10. The method according to claim 8, characterized in that the plurality of plate members of the first member comprises a first plate member having the first flexible portion, and at least one second plate member having a thin portion at a position corresponding to the first flexible portion;

the plurality of plate members of the second member comprises a third plate member having the second flexible portion, and at least one fourth plate member having a thin portion at a position corresponding to the second flexible portion;

each of the first and second flexible portions and the thin portions comprises an annular groove and a thick portion disposed inside the annular groove; and the interconnecting member interconnects the thick portion of the second plate member nearest to the second member and the thick portion of the fourth member nearest to the first member.

11. The method according to claim 10, characterized in that the interconnecting member comprises a plurality of plate members processed by etching.

12. The method according to any of claim 8, characterized in that the sensor is a strain gauge type sensor comprising a strain gauge or a piezoresistive element as the detecting element.

13. The method according to any of claim 8, characterized in that the sensor is a capacitance type sensor comprising the detecting element having a pair of electrodes being opposed to each other at a distance.

14. The method according to any of claim 8, characterized in that the sensor is a resistance type sensor comprising the detecting element having a pressure-sensitive resistive substance between a pair of electrodes.

* * * * *

UNITED STATES PATENT AND TRADEMARK OFFICE
CERTIFICATE OF CORRECTION

| | | |
|---|---|---|
| PATENT NO. | : 7,852,191 B2 | Page 1 of 1 |
| APPLICATION NO. | : 11/939260 | |
| DATED | : December 14, 2010 | |
| INVENTOR(S) | : Hideo Morimoto | |

It is certified that error appears in the above-identified patent and that said Letters Patent is hereby corrected as shown below:

In claim 5, column 12, line 38, the words "any of" should not appear in the text.

In claim 6, column 12, line 43, the words "any of" should not appear in the text.

In claim 7, column 12, line 47, the words "any of" should not appear in the text.

In claim 12, column 14, line 16, the words "any of" should not appear in the text In claim 13, column 14, line 20, the words "any of" should not appear in the text.

In claim 14, column 14, line 24, the words "any of" should not appear in the text.

Signed and Sealed this
Seventeenth Day of May, 2011

David J. Kappos
*Director of the United States Patent and Trademark Office*